March 10, 1931.  C. W. WILLIAMS  1,795,587
MACHINE FOR EXAMINATION AND TREATMENT OF EYE CONDITIONS
Filed March 20, 1928

Claude Warren Williams INVENTOR
BY Loyal J. Miller
ATTORNEY

Patented Mar. 10, 1931

1,795,587

UNITED STATES PATENT OFFICE

CLAUDE WARREN WILLIAMS, OF PAWHUSKA, OKLAHOMA

MACHINE FOR EXAMINATION AND TREATMENT OF EYE CONDITIONS

Application filed March 20, 1928. Serial No. 263,124.

My invention relates to improvements in machines for use in making examinations of eyes and in exercising the muscles of the eye for strengthening them.

The principal objects of my invention are to provide a machine of this character in which the lenses used in examining and treating the eyes are made from a distance from the patient to rotate upon their own axes as well as being revolved consecutively from a distance in front of the eye; to provide sets of revolving discs containing lenses, both plus and minus, of spherical, cylindrical and prismatic surfaces and of various colored glasses or combinations of the same; to provide means for turning the cylindrical and prismatic surfaced lenses from a distance to any desired angle with reference to the patient's eye and preserving this degree of angularity in the fitting of glasses; to provide a machine of this character so that the optician may take a position in front of and some distance away from the patient and retain such position while the muscular examination, retinoscopy and treatment is being given; to provide means for bringing from said distance any desired lens before either the right or left eye and in any order in making examination and fitting the said lens to correct astigmatism, myopia, hypermetropia or any other defect of the eye.

With these and other objects in view my invention consists of the construction, novel features and combination of parts hereinafter more fully described, illustrated in the accompanying one-sheet drawing and pointed out in the claims hereto appended.

Various changes in the form, proportion, size, shape, weight and minor details of construction, within the scope of my invention may be resorted to without departing from the spirit or principle of the invention or sacrificing any of the advantages thereof.

Figure 1:
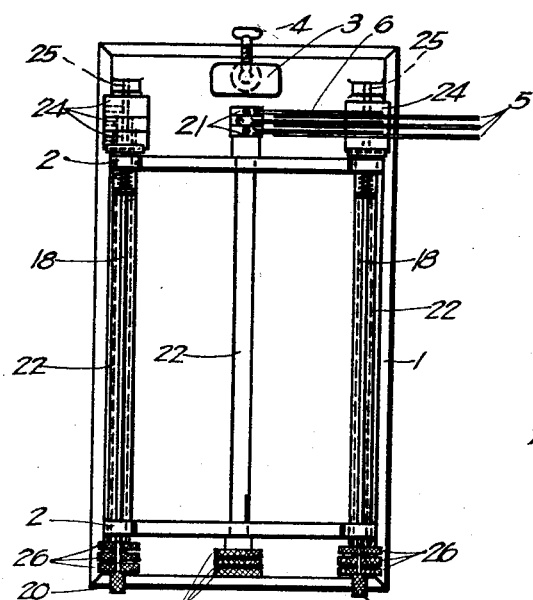
Figure 4:
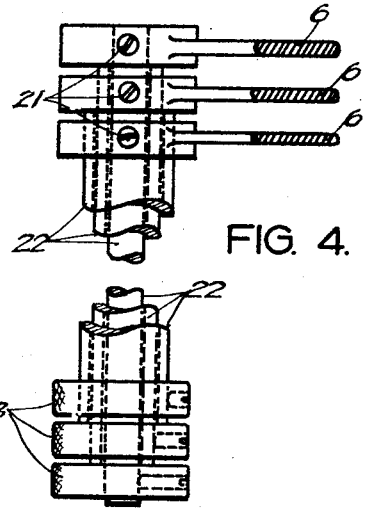
Figure 2:
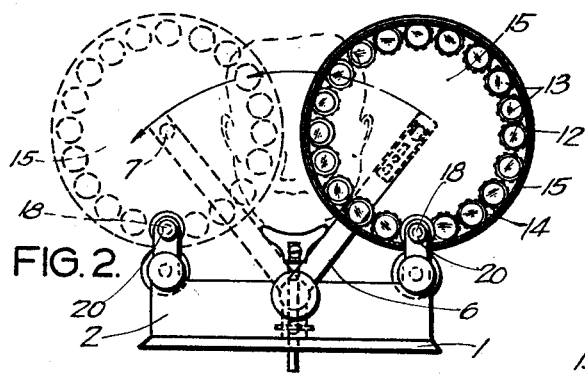
Figure 5:
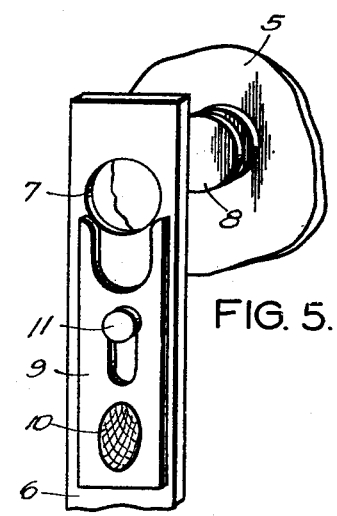
Figure 3:
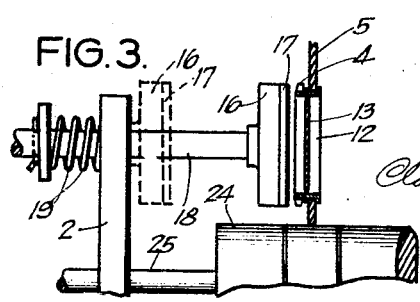
Figure 6:
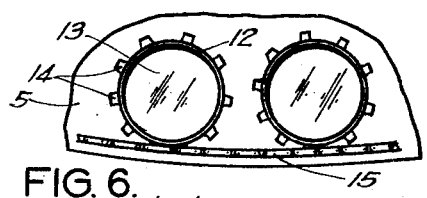

In the accompanying drawing, Figure 1 is a plan view of the assembled apparatus; Fig. 2 is a front elevational view showing the device with relation to the patient; Fig. 3 is a fragmentary view showing means for turning the lens holder and perforated discs; Fig. 4 is a fragmentary view of the extension shaft and sleeves for shifting the perforated disc from one eye to the other; Fig. 5 is a fragmentary view showing means for mounting the perforated disc upon the supporting arm; and Fig. 6 is a fragmentary view of the perforated disc showing the lens holder enlarged with gears and sprocket chain for rotating the lens.

The usual method of testing the eyes and fitting glasses is to have the patient wear a fitting glasses into which the optician fits large frame into which the optician fits lenses of various shapes and magnifying power, one or two at a time, have the patient read printed matter or observe sets of vertically or horizontally parallel lines placed at different distances, the loose lenses being changed until the proper ones are found. By this method it is difficult to rotate the lenses to the proper angle required in some cases and almost impossible to retain this angle once it is found. It requires that the optician pass from the patient to printed chart and back again many times. My invention is for the purpose of correcting these inconvenient and uncertain methods as will be shown in the following description.

Like characters of reference designate like parts in all the figures.

The device consists of the base 1, transverse supporting members 2, the adjustable chin rest 3 positioned at one end of the said base and provided with the set screw 4, a plurality of perforated discs 5, supported by oscillatory arms 6, the free ends of said arms being provided with a perforation 7, through which the axle 8 of the said discs 5 is positioned and held by the latch 9, the said latch 9 is adjusted by means of the knurled button 10, and held in movable connection with the said supporting arm 6 by the rivet 11. Positioned in the perforations adjacent the outer periphery of the discs 5 are the lens holders 12, containing the lenses 13, the said holders 12 being provided with sprockets 14 for engagement with the sprocket chain 15. A driving disc 16 provided with a friction face lining 17 is secured to the end of a push rod 18, the said push rod being provided with the encircling spiral retrieving spring 19, the end 20 of the said rod 18 is furnished with a knurled handle. It is to be noted that the parts just described are provided in duplicate so as to perform like functions in connection with both eyes. The oscillatory arms 6 are furnished with hubs and set-screws 21 as means for adjustably attaching the said arms 6 to extension shaft and sleeves 22, nested as best shown in Fig. 4 and each provided with a knurled hand grip 23 for swinging the perforated discs 5 into any desired position in front of the eyes. The circumferential edge of the perforated discs 5 rest upon the cylinders 24, the surface of said cylinder being enveloped with any elastic material such as rubber, thus transmitting positive motion to the said discs 5 when the said cylinder 24 is rotated by means of the extension shaft 25 and the knurled hand grip 26; here again the parts just described are duplicated so as to operate alike for both eyes.

From the foregoing description it can readily be seen that discs 5 to any desired number may have their respective lens holders loaded with lenses of plus and minus spherical, cylindrical and prismatic shapes and combinations of the same and of various colors, as the experience of the oculist and optician may decide, these discs with their plurality of lenses can be mounted upon the supporting arms 6, and after the patient's eyes are in proper position through adjustment of the chin rest 3, the said discs 5 can be brought into position before either eye or both eyes by means of the knurled hand grips 23 and the extension shaft and sleeves 22. The longitudinal dimension of the base 1 and the lengths of the shafts and push rods supported thereby may be varied so as to place the operator at any desired distance in front of the patient while the examination and treatment is being conducted. The optician or oculist can revolve any lens into position before the eye by turning cylinders 24 upon which the discs 5 rest. When any lens is in position and it is desired to change the angularity of the lens with respect to the patient's eye, rod 18 is pushed forward until disc 16 is in contact with a lens holder at the bottom of the said disc 5. On turning the push rod 18 the said lens holder will rotate and actuate the sprocket chain 15 thus causing all the lenses on that disc to rotate in the same direction and through the same angle. When the desired rotation and angle is found the push rod is released, the retrieving spring 19 moves the disc 16 out of contact with the lens holder and the exact angle of the lens is preserved.

Having thus described my invention what is claimed and desired to be secured by Letters Patent, is:

1. A device, as and for the purposes described, having in combination, a base having an adjustable chin rest on its rear end, a plurality of telescoped cylindrical shafts mounted rotally on and extending centrally and longitudinally from the front to the rear portion of said base, a plurality of radial arms each rigidly mounted perpendicularly on the rear end of one of said shafts, said arms adapted to be selectively swung to either side of said base by the partial rotation of one of said shafts, a plurality of discs each rotally mounted axially on the outer end of one of said arms, each of said discs having a circle of circular perforations within and adjacent its outer periphery, a plurality of cylinders each mounted rotally in one of said perforations, each of said cylinders having a lens secured therein and having a sprocket around one of its ends, an endless sprocket chain mounted around all of said sprockets in a manner imparting a simultaneous rotary motion to all of said sprockets when one of said sprockets is rotated, and means for rotating said sprockets from the front end of said base, and means for rotating said discs from the front end of said base.

2. Organization as claimed in claim 1, in which the sprocket rotating means comprises a rod rotally mounted on and extending from the front end to the rear portion of said base, said rod limitedly slidable longitudinally, a friction disc rigidly mounted on the rear end of said rod for contacting the front end of one of said cylinders and causing its rotation when said rod is rotated from its front end.

3. Organization as claimed in claim 1, in which said disc rotating means comprises a rod rotally mounted on and extending from the front end to the rear portion of said base, a friction cylinder rigidly mounted on the rear end of said rod, said cylinder adapted to contact the periphery of said discs and cause their rotation when said rod is rotated from its front end.

4. In a device as and for the purposes described, the combination with a base supporting at its rear end a disc rotally mounted on a radius arm, said disc carrying a circle of lenses each rotally mounted thereon, of means for swinging said disc to either side of said base from a position at the front end of said base, and means for simultaneously rotating all of said lenses on their own axes from a position located at the front end of said base.

5. Organization as claimed in claim 4, in which said lens rotating means comprises a plurality of sprockets each positioned around one of said lenses, a sprocket chain surrounding all of said sprockets, a rod rotally mounted on and extending from the front end to the rear portion of said base, said rod limitedly slidable longitudinally, a friction disc rigidly mounted on the rear end of said rod for contacting the front face of one of said sprockets and causing its rotation when said rod is rotated from its front end.

CLAUDE WARREN WILLIAMS.